United States Patent [19]

Doemen

[11] 4,030,005

[45] June 14, 1977

[54] BRUSHLESS D.C. MOTOR HAVING ROTOR POSITION-DEPENDENT CONTROL MEANS

[75] Inventor: Benno Doemen, St. Georgen, Germany

[73] Assignee: Papst-Motoren KG, St. Georgen, Germany

[22] Filed: Apr. 23, 1975

[21] Appl. No.: 570,837

[30] Foreign Application Priority Data

Apr. 23, 1974 Germany .......................... 2419432

[52] U.S. Cl. ............................... 318/138; 318/439
[51] Int. Cl.² ...................................... H02K 29/00
[58] Field of Search ........................... 318/138, 439

[56] References Cited

UNITED STATES PATENTS

| | | | |
|---|---|---|---|
| 3,716,769 | 2/1973 | Brunner | 318/138 X |
| 3,840,761 | 10/1974 | Muller | 318/138 X |
| 3,873,897 | 3/1975 | Muller | 318/138 |

Primary Examiner—Robert K. Schaefer
Assistant Examiner—W. E. Duncanson, Jr.
Attorney, Agent, or Firm—Flynn & Frishauf

[57] ABSTRACT

A brushless d.c. motor comprises a stator having stator winding means thereon, a permanent magnet rotor rotatable relative to the stator and a rotor position-dependent semiconductor commutating means coupled to the stator winding means for controlling the currents in the stator winding means. Further provided is means including amplifying means responsive to the outputs of the control means for reducing the currents in the stator winding means at predetermined rotor position ranges to substantially zero. The semiconductor control means is preferably a Hall generator.

50 Claims, 14 Drawing Figures

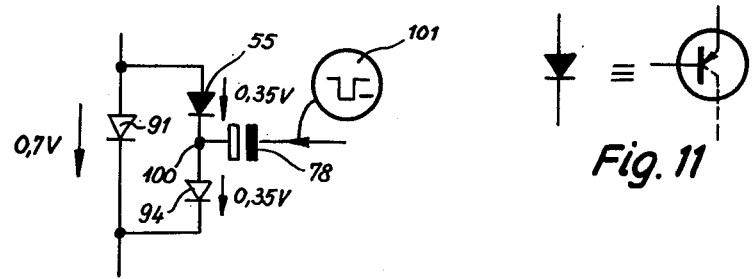
*Fig. 10*  *Fig. 11*
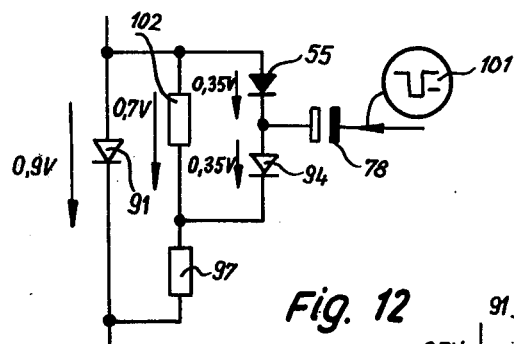
*Fig. 12*
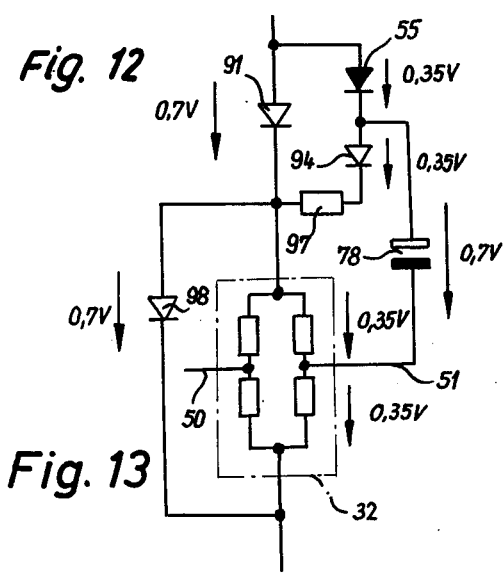
*Fig. 13*

BRUSHLESS D.C. MOTOR HAVING ROTOR POSITION-DEPENDENT CONTROL MEANS

Cross reference to related patents, assigned to the assignee of this application: 3,873,897, Muller 3,840,761, Muller This invention relates to a brushless direct current motor with a permanent magnetic rotor, and more particularly to such a motor comprising rotor position-dependent semiconductor control means (e.g. a Hall generator) for controlling the currents in two associated windings, or in one associated single winding through which oppositely directed currents alternately flow.

Numerous brushless direct current motor designs are known. For example, German Disclosure Document No. 1,954,409 in FIG. 2 shows a brushless direct current motor controlled by two Hall generators wherein by means of a commutating resistor 31 the current is caused to flow for about 90 electrical degrees in each of the four motor windings. While such a motor provides a very uniform torque it is expensive, due to the many electronic components and particularly in the case of small motors it is normally necessary to position these components outside of the motor. Such motors are too costly for many applications.

Less complicated motors with a fewer number of components are also known, for example from U.S. Pat. No. 2,753,501. However, these motors are not suitable for a great number of applications.

Therefore, the object of the present invention is to improve upon the known brushless direct current motors.

SUMMARY OF THE INVENTION

According to one feature of the present invention, a brushless direct current motor of the type described above, includes a rotor position-dependent semiconductor control means for controlling the winding currents in predetermined rotor position ranges such that they are reduced, preferably to zero.

According to a further feature of the invention, the control means includes means for protecting a brushless d.c. motor against overheating in the event that the motor is prevented from rotating by external influences. To this end a capacitive coupling to the semiconductor control means is used in conjunction with suitable discharge circuits for capacitive coupling members.

BRIEF DESCRIPTION OF THE DRAWINGS

FIGS. 10 to 14 are circuit diagrams for explaining the operation of the arrangement of FIG. 9.

DETAILED DESCRIPTION OF ILLUSTRATED EMBODIMENTS

The invention is preferably but not exclusively used in connection with single phase brushless d.c. motors, such as those shown in German Disclosure Document No. 2,225,442, corresponding to U.S. Pat. No. 3,840,761, and Ser. No. 363,290, which start automatically and produce a positive starting torque in all angular positions during operation. However, the present invention is also suitable for single or multi-phase brushless d.c. motors having a constant air gap and semiconductor control means for commutating the coil currents, said control means having the advantage of ensuring that the motor always runs in the correct direction.

Thus, the present invention can also be used with brushless direct current motors having more than two windings, and this applies particularly in connection with the measures for preventing overheating of the motor when the rotor is stalled, said measures having a wide range of independent uses.

Figure 1:
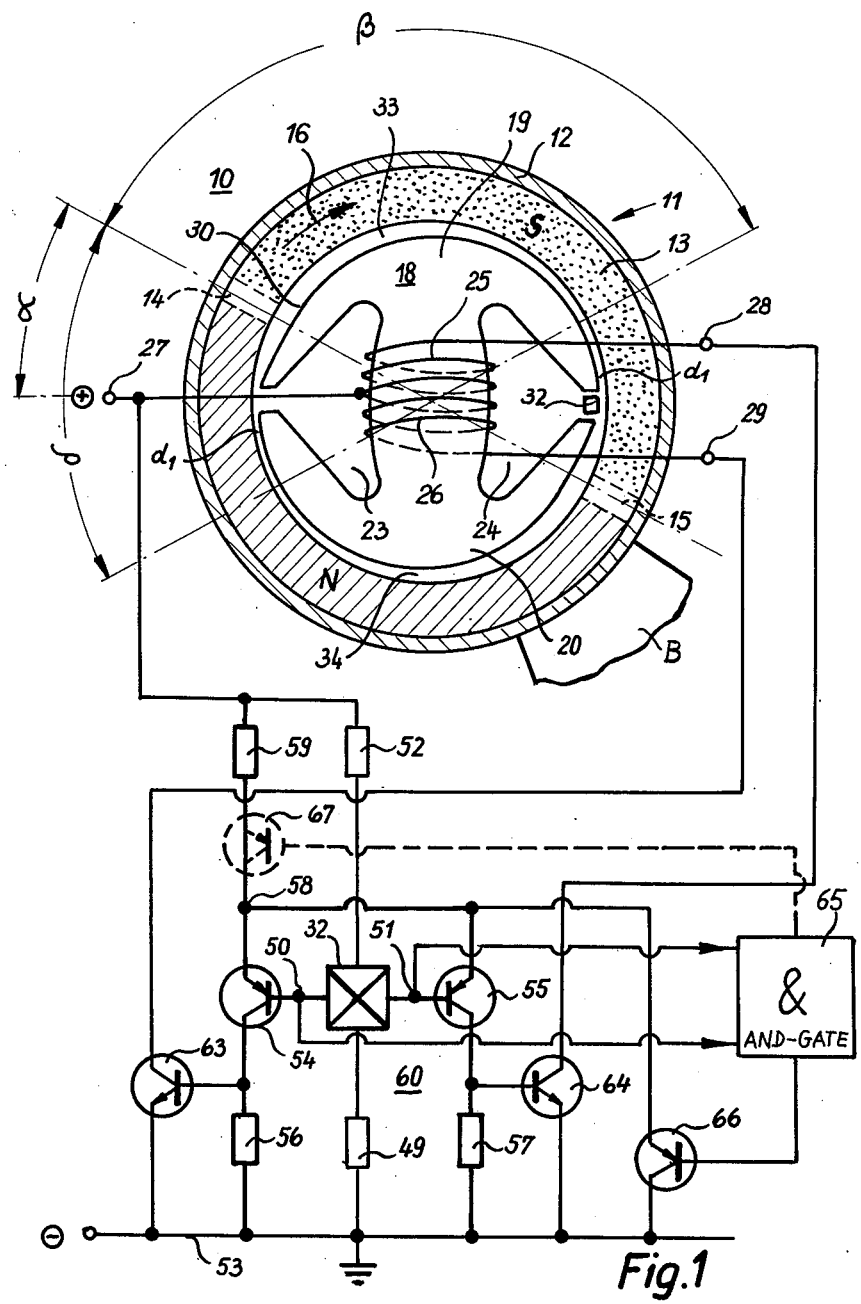
FIG. 1 is a schematic representation of an embodiment of a brushless direct current motor according to the invention constructed as a motor of the external rotor type, being a single phase motor with two drive windings and having a control circuit controlled by a single Hall generator.
Figure 3:
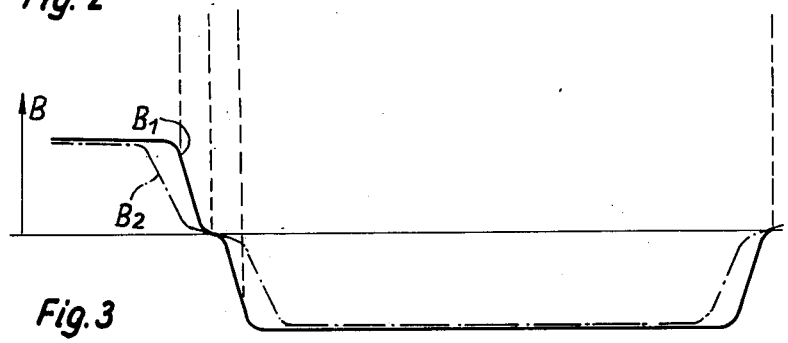
FIG. 3 is a graph showing the flux densities measured along the rotor according to FIG. 2.

In order to facilitate understanding of the present inventive concept, FIG. 1 shows as an example a motor of the external rotor type with an external bi-polar rotor 11 constructed as an annular magnet whose radial magnetization $B_1$ in the motor part has approximately the configuration of FIG. 3. This configuration is characterized by a substantially constant flux density in the area of the poles, and by relatively narrow (10° to 20° electrical) pole clearances 14 and 15. This type of magnetization is normally called trapezoidal.

The motor of the present invention is preferably used as a ventilating device with air moving means such as blades, a cage, or the like, connected to the rotor. Preferably the air moving means is directly connected to the rotor. In FIG. 1 a single blade B is partially shown by way of example. Actually a plurality of blades B are provided, only one being shown for ease of illustration.

Rotor 11 has a peripheral portion 12 made from soft iron which portion can be pot shaped, or merely a pot, the base of which is connected to the motor shaft, as shown. The magnet 13 is placed into magnet 13, for example, can be a curved piece of rubber magnet i.e., a magnet strip made of rubber or plastic mixture with incorporates magnetic particles In FIGS. 1 and 2, the areas with substantially constant flux density are symbolically shown by hatching for the North pole and by stippling, or closely spaced dots (i.e., a grey color) for the South pole.

FIG. 1 shows the rotor 11 in one of its two stable rest positions which it can assume when the motor drive windings are de-energized. These rest positions are determined by the form of the air gap and of the magnetization $B_1$ (FIG. 3). In operation the rotor rotates in the direction of arrow 16.

The stator 18 of motor 10 is constructed as a double T armature with an upper pole 19 and a lower pole 20 enclosing between them two slots 23 and 24, wherein are arranged series-connected winding halves 25 and 26 of a single phase winding whose center tap is connected to a positive pole 27 and whose free ends are designated by 28 or 29. A Hall generator 32 is arranged at the opening of slot 24 or an electrically equivalent point.

The air gap 33 over pole 19 and the air gap 34 over pole 20 are constructed in a special manner in accordance with the teaching of U.S. Pat. application Ser. No. 527,345, filed Nov. 26, 1974, to which reference is to be made and which is incorporated herein by reference.

Figure 2:
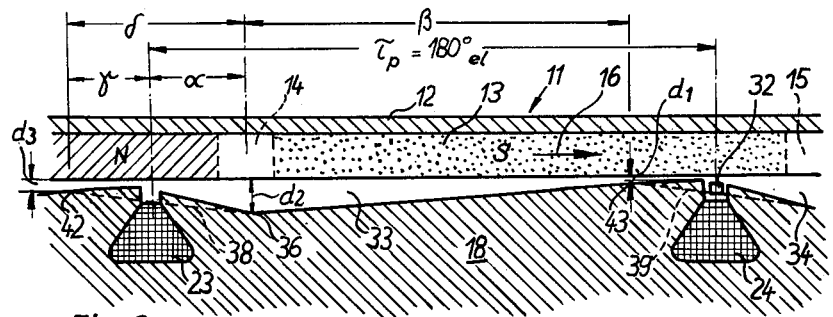
FIG. 2 is a development of the essential parts of the magnetic circuit of the motor according to FIG. 1.

FIG. 2 shows the development of the upper air gap 33 which is radially symmetrical to the lower air gap 34. FIG. 2 shows rotor 11 at the top and stator 18 at the bottom over a pole arc of about 180° electrical. Starting from slot 23 the air gap 33 increases monotonically over a first angle $\alpha$ (e.g. 10° to 50° electrical) to a point 36 where the maximum value $d_2$ of air gap 33 is reached. From there the actual air gap 33 monotonically decreases over a second angular range (e.g., 80° to 170° electrical) up to the opening of slot 24 where the minimum value $d_1$ of the actual air gap 33 is reached. From there, air gap 34 following air gap 33 again increased monotonically to the next point 36.

As the opening of slots 23 and 24 must have a predetermined size for the insertion of windings 25,26 and their insulation, they result in the magnetically active air gap being considerably larger in the area of these slot openings and having approximately the configuration shown in FIG. 2 as 38 for slot 23 and 39 for slot 24. That is, magnetically active air gap has its minimum $d_3$ approximately at the two points 42 and 43 in each case located at an angle $\gamma$ (e.g. 10° to 40° electrical) in front of the associated slot opening. Therefore the two angles $\alpha$ and $\gamma$ together add up to an angle of $\delta$ within which the magnetically active air gap increases in the rotation direction. This active air gap is decisive for the form of the reluctance torque. Preferably this angle $\delta$ is such that the Hall generator 32 is arranged approximately in the center thereof or displaced by $n \times 180°$ electrical relative to the center thereof, where $n = 1, 2$ etc.

FIGS. 1 and 2 show the rotor 11 in its stable rest position wherein its two poles face small air gap areas and the position of pole clearances 14,15 coincides approximately with the maximum air gap positions 36, because in these positions the overall magnetic resistance of the air gap is lowest.

If rotor 11 is rotated from this stable rest position by an angle $\beta$ in the rotation direction 16, power must be supplied to rotor 11 from the outside because the magnetic resistance in the air gap increases. In other words, the rotor 11 is braked by a reluctance torque. In operation this power is supplied by the current in winding 25 or 26.

After rotating by the angle $\beta$, rotor 11 reaches a position wherein its pole clearances 14 and 15 are positioned on (i.e. straddle) the positions 42,43 of minimum active air gap. The overall magnetic resistance of the air gap is maximum in this position, i.e., at this point maximum magnetic energy is stored in the motor and rotor 11 in this unstable position attempts to rotate in one or the other direction until it has again reached one of the two possible stable positions. If rotor 11 is, for example, further rotated in the direction of arrow 16, even without the supply of an electrical current, it delivers a driving torque which, with an appropriate uniform increase of the active air gap, has a substantially constant amplitude.

Thus, there is a braking reluctance torque in the range $\beta$ wherein pole clearances 14,15 pass over areas of decreasing active air gap, and a driving reluctance torque is present in angular range $\delta$ in which the pole clearances 14,15 are passing over areas of increasing active air gap.

Figure 4:
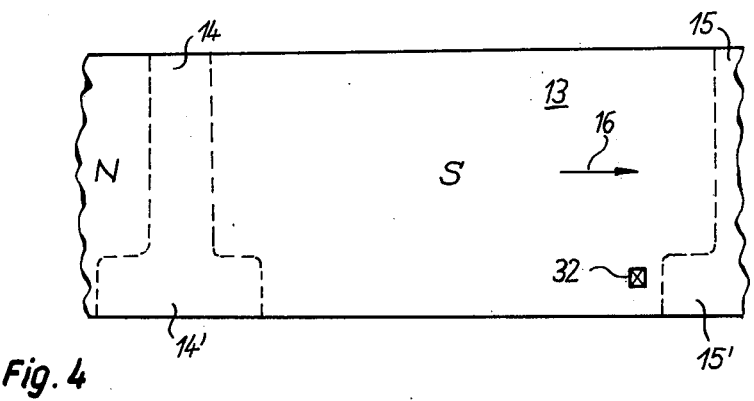
FIG. 4 is a developed plan view of the inside of the rotor of FIG. 2 which more particularly illustrates the configuration of the pole clearances.
Figure 5:
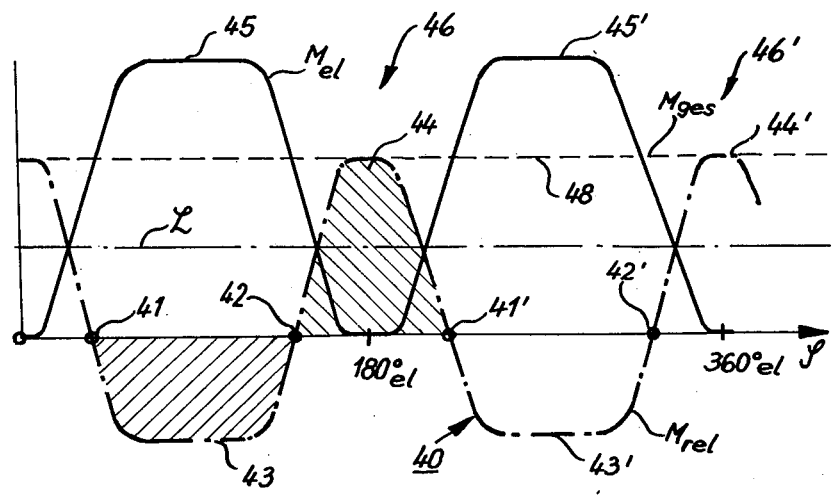
FIG. 5 is a graph showing typical torque curves of the motor of FIGS. 1 and 2.

FIG. 5 shows this configuration of reluctance torque $M_{rel}$ designated therein by 40 over one rotor rotation, i.e., 360° electrical. 41 is the stable rotor position shown in FIGS. 1 and 2, 41' the stable rotor position symmetrical thereto. Between these two stable positions 41 and 41' is located an unstable rotor position 42 corresponding to an unstable position 42' symmetrical thereto. At points 41, 41', 42 and 42' the reluctance 40 has a value zero. It is also possible to see the pattern of the braking reluctance torque designated by 43 and 43' between points 41 and 42 and between 41' and 42' whose length is substantially determined by the angle $\beta$, and the following range 44 or 44' of the driving reluctance torque whose length is substantially determined by the angle $\delta$. FIG. 4 also shows the pattern of the electromagnetic drive torque $M_{el}$ designated by 45 or 45' which may have the value zero during the driving reluctance torque 44 or 44', i.e., in the ranges around the theoretical commutating instants 180° electrical, 360° electrical, etc.

Since the current in motor windings 25,26 is controlled by the magnetic field of rotor 11 via Hall generator 32, the form appropriately selected for the magnetization of rotor magnet 13 is that shown by $B_2$ in FIG. 3 and schematically indicated in the lower part of FIG. 4, i.e., that part of magnet 13 which controls Hall generator 32 comprises pole clearances 14' and 15' which are wider than the other pole clearances 14 and 15. Therefore, during rotation relatively large rotor sections in which the flux density is not much above zero act on Hall generator 32 which is advantageously displaced somewhat from the neutral zone counter to the rotation direction 16 (FIG. 2 shows the arrangement in the neutral zone, and FIG. 4 a displacement). Instead of displacing Hall generator 32 from the neutral zone, the pole clearances 14' and 15' can be arranged unsymmetrically relative to pole clearances 14 and 15, while Hall generator 32 remains in the neutral zone as in FIGS. 1 and 2, resulting in the same action. This arrangement has the advantage that the same Hall generator position can be used for both rotation directions while the rotor magnets must then be magnetized differently according to the desired rotation direction.

If the flux density acting on Hall generator 32 is approximately equal to zero, both outputs 50 and 51 of the Hall generator have approximately the same potential, and according to the present invention the information which can be gathered from this signal combination is used for reducing the current in both windings 25 and 26, i.e. for producing a current gap.

Referring to FIG. 1, Hall generator 32 whose one control terminal is connected to positive terminal 27 of a d.c. voltage supply (e.g., 24 V) via a resistor 52 and whose other control terminal is connected via a resistor 49 to the negative lead 53 of the voltage supply is used for controlling the current in windings 25 and 26 as a function of the position of the poles of rotor 11. The two outputs 50 and 52 of Hall generator 32 are connected to the bases of two p-n-p-transistors 54 and 55 whose collectors are connected to the negative voltage supply terminal 53 via resistors 56 and 57, respectively, and their emitters are connected with the positive voltage supply terminal 27 via a common nodal point 58 and a common resistor 59. Thus, transistors 54 and 55 operate as a differential amplifier 60. The base of an n-p-n-transistor 63 whose emitter is connected to negative and whose collector is connected to winding terminal 29 is connected to collector of transistor 54. In the same way the base of an n-p-n-transistor 64 whose emitter is connected to negative and whose collector is connected to the winding terminal 28 is connected to the collector of transistor 55.

Operation of circuit of FIG. 1:

Transistors 55 and 64 and therefore motor winding 25 are switched ON when the South pole of rotor 11 (as shown in FIG. 1 and 2) passes Hall generator 32. In the same way transistors 54 and 63 and therefore winding 26 and switched ON when the North pole of rotor 11 passes Hall generator 32. Thus, the two windings 25 and 26 produce the electromagnetic driving torque 45,45' represented in FIG. 5 which is substantially constant over a relatively large angular range as a result of (a) the substantially constant flux density $B_1$ (FIG. 3) of rotor magnet 13 in wide ranges; and (b) the motor current which is substantially constant in similar ranges. The counter-electromotive force induced in the two motor windings 25 and 26 is also substantially constant in this angular range, i.e. the motor efficiency is very good therein because the ratio of counter-electromotive force to applied d.c. voltage (between 27 and 53) is high. Therefore in the interest of a high efficiency, a voltage should only be applied to the windings in the angular range with high flux density $B_1$, i.e. with a high counter-electromotive force (counter EMF). If this is done a further advantage is obtained in that on switching OFF the current through the motor windings at a point in time when a high counter-electromotive force is present on the latter, only a small switching voltage peak occurs, mainly because the difference between applied voltage and counter-electromotive force is small. If switching OFF would occur when the counter EMF decreases, then the motor current could have risen and the current would therefore be more difficult to switch OFF.

Thus the current through the motor windings ought to be already interrupted or OFF when the counter-electromotive force is on its decreasing curve portion because this leads to higher efficiency and smaller interrupting peaks, i.e., less radio interference. In addition, the transistors can then be utilized in an optimum manner so that small sized components can be used which can be easily fitted in a small motor. This is particularly important in connection with axial fans because very short overall lengths are stipulated, e.g. only 38 mm, making it necessary to optimally use all of the space available in the motor. Additionally, the noise level in such a motor is reduced if the motor current is interrupted when the counter EMF is still high. Thus, there is a requirement to make the currents in both motor windings at least approximately zero during specific angular ranges, around the theoretical commutating instants.

FIG. 1 schematically shows two possibilities for doing this. For the purpose of suppressing the currents in both windings 25 and 26 when both outputs of the Hall generator 32 have approximately the same potential, said outputs are connected to two inputs of an AND gate 65 which is constructed in such a way that it only emits an output signal when its two inputs have approximately the same potential.

Figure 9:
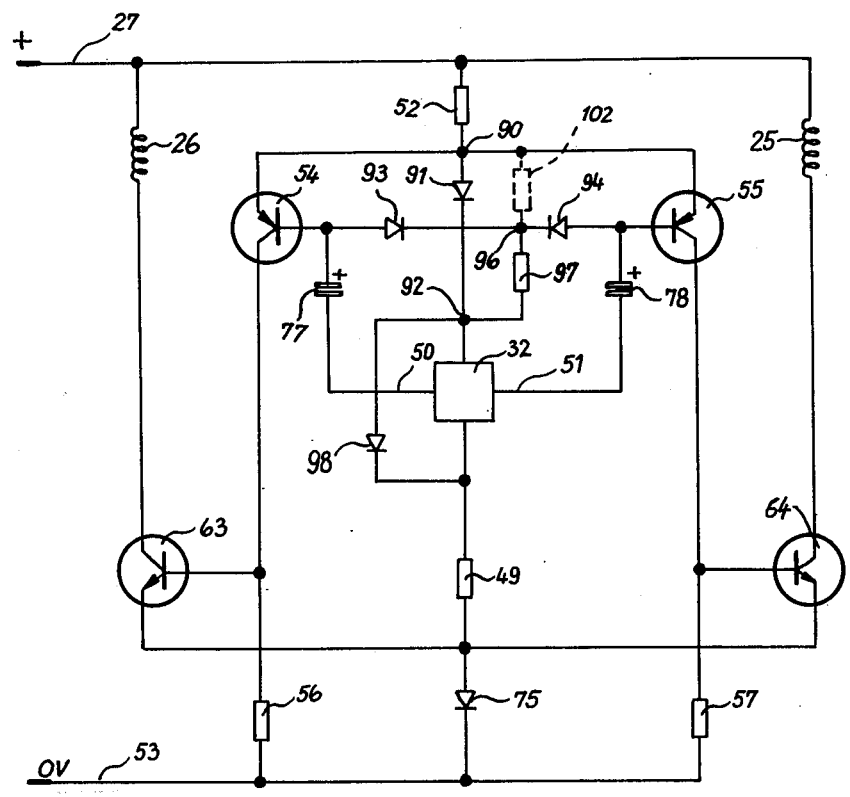
FIG. 9 is a circuit diagram of a fourth circuit arrangement according to the invention.

The AND gate 65 either control, as shown, a p-n-p-transistor 66 whose emitter-collector path is connected between nodal point 58 and negative lead 53, or it controls a transistor 67 whose emitter-collector path is connected between nodal point 58 and resistor 59. A third possibility, as explained hereinafter relative to FIG. 9, is for the AND gate 65 to directly block both transistors 54 and 55 when the said specific signal combination occurs at its input.

Figure 6:
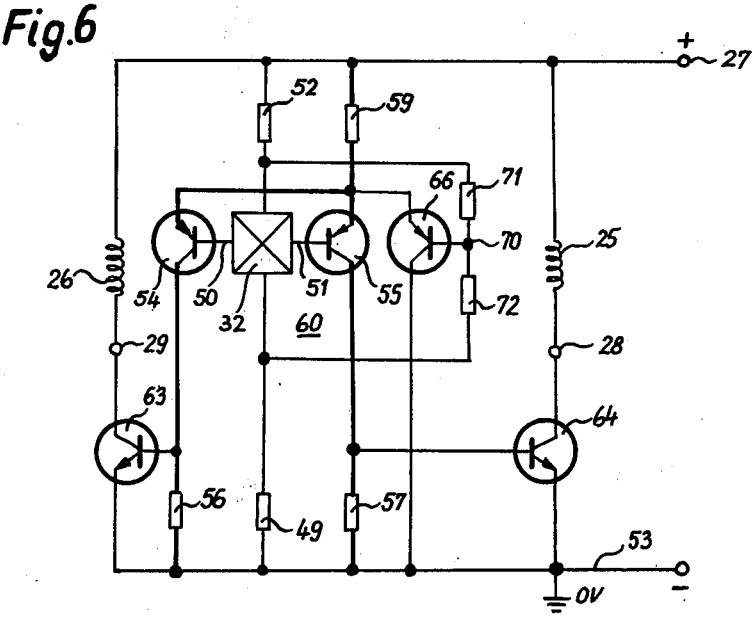
FIG. 6 is a circuit diagram of a first circuit arrangement according to the invention.

Naturally, every effort is made to produce the circuit shown in FIG. 1 as inexpensively as possible, i.e., with the minimum number of components. FIG. 6 shows a first circuit variant satisfying this requirement. Elements which are the same or function the same as those shown in FIG. 1 are given the same reference numerals and are not described again. The same motor as in FIG. 1 is used.

The circuit according to FIG. 6 uses a differential amplifier 60 with three identical transistors 54,55 and 66 whose emitter-collector paths are parallel to one another so that they represent three branches of the differential amplifier. Unlike in FIG. 1 the base of transistor 66 is connected to a tap 70 of a voltage divider whose one resistor 71 leads to the positive current terminal of Hall generator 32 and the other resistor 72 leads to the negative current terminal of Hall generator 32. Operation of the circuit of FIG. 6: In general, and when a relatively strong field acts on Hall Generator 36, the operation is the same as described in detail with reference to FIG. 1, i.e. if a South pole faces Hall generator 32 the output 51 thereof becomes more negative and switches on transistors 55 and 64 and therefore winding 25, while its output 50 becomes more positive and blocks transistors 54 and 63. When a North pole faces Hall generator 32 the output 51 becomes more positive and the output 50 more negative and winding 26 is connected. In both cases the base of the conducting transistor 54 or 55 of differential amplifier 60 is more negative than the base of transistor 66 so that the latter remains blocked.

Thus, with this circuit the highest current always flows over that one of the preferably identical transistors 54, 55 or 66 which has the most negative base potential, the voltage drop at resistor 59 acting as a negative feedback. If voltage divider 71, 72 is constructed in such a way that the base of transistor 66 is about 0.15V more negative than the output potentials of Hall generator 32 when the said potentials are equal, i.e. when flux density $B_2$ (FIG. 3) is approximately zero, transistor 66 in this case receives so much current via resistor 59 that transistors 54 and 55 are blocked so that transistors 63 and 64 and therefore motor windings 25 and 26 are de-energized.

An advantage of the circuit according to FIG. 6 is that the potential at nodal point or junction 70 is substantially independent of magnetic field $B_2$, but is dependent on the temperature of Hall generator 32, and therefore within certain limits compensates the temperature dependency of the Hall generator. Furthermore, the transition of transistor 66 from the conducting state into the blocking stage and vice versa is continuous which, in conjunction with the shape of curves $B_1$ and $B_2$ in FIG. 3, brings about an advantageous switching behavior wich is substantially free from the generation of radio interference signals. In addition, resistors 56 and 57 can be high valued because the full output current of the differential amplifier is supplied to the conducting one of transistors 63 and 64.

Figure 7:
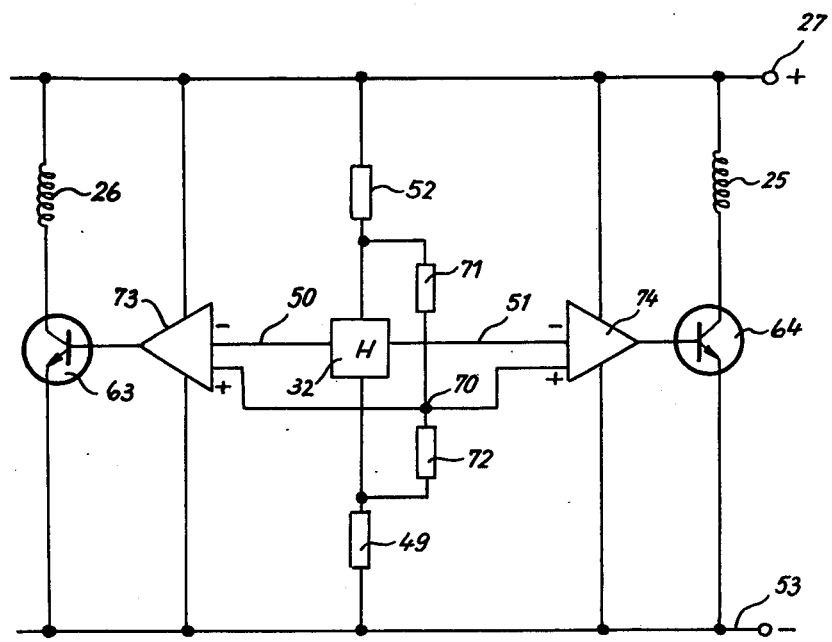
FIG. 7 is a circuit diagram of a second circuit arrangement according to the invention.

The same principle can also be used when employing operational amplifiers 73,74, as shown in FIG. 7. Parts which are the same or function in the same way as those shown in FIG. 6 are given the same reference numerals and are not described again. The negative input of operational amplifier 73 is connected to the Hall generator output 50 and the negative input of operational amplifier 74, to the Hall generator output 51. The two positive inputs of the operational amplifiers are connected to nodal point 70.

Operation according to FIG. 7:

If $B_2$ is zero the outputs 50 and 51 have the same potential and nodal point 70 is about 0.15 V more negative than this potential so that both operational amplifiers 73 and 74 are blocked, and none of the windings 25 and 26 receive current.

If the full magnetic field acts on Hall generator 32, the negative input of operational amplifier 73 and 74 is at least 0.15 V more negative than the nodal point 70 and the particular operational amplifier conducts. Thus the same effect is obtained as with the arrangement of FIG. 6.

In certain cases the additional requirement is made that the motor must be burnout-proof or stall-proof, i.e., when the motor is stalled that is, its rotor blocked, its current must assume a value adapted to prevent destruction of the motor through overheating and other damage resulting from too great an evolution of heat; this stall current value should be as low as possible.

Figure 8:
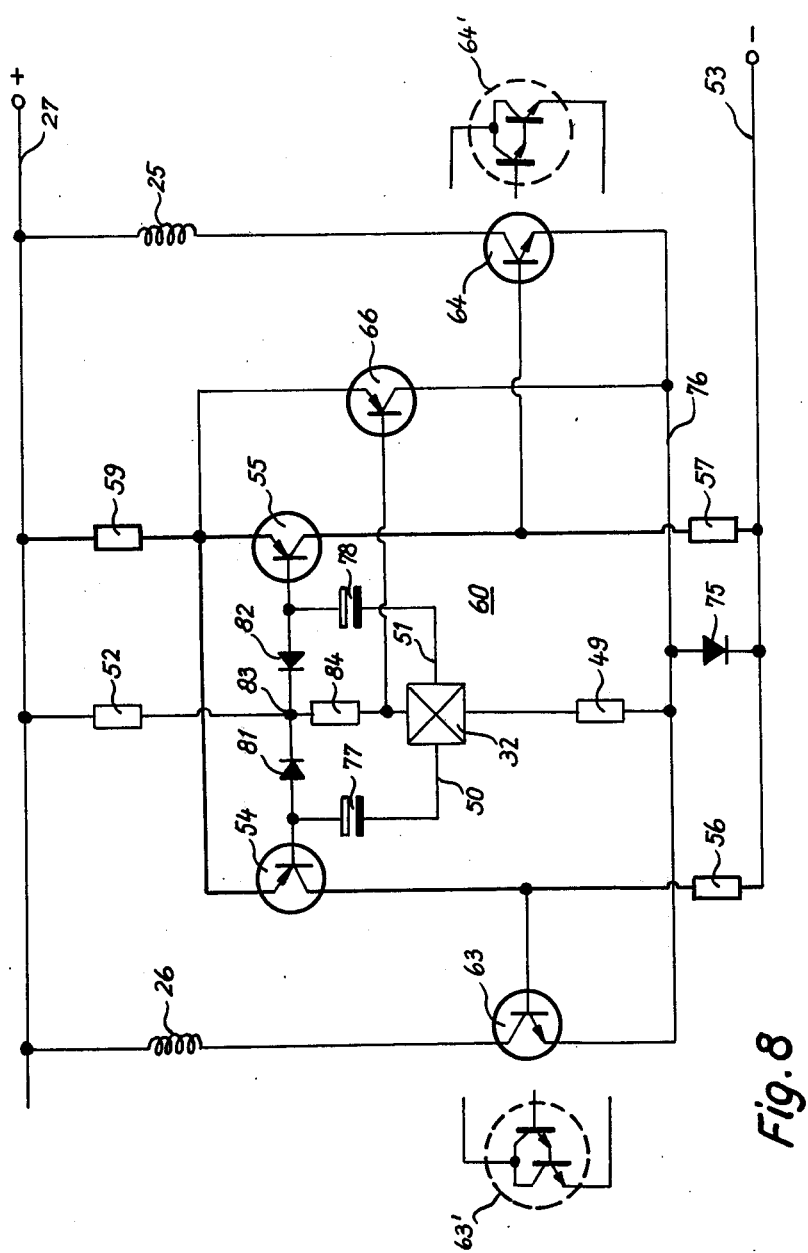
FIG. 8 is a circuit diagram of a third circuit arrangement according to the invention.

FIG. 8 shows a circuit which is burnout-proof or stall-proof in addition to providing the already described current suppression at low flux densities acting on the Hall generator. Parts which are the same or act in the same way as in the circuit of FIG. 1 are given the same reference numerals and are not described again.

To protect against an incorrect connection to the direct current system, in the circuit of FIG. 8 a protective diode 75 is provided whose cathode is connected to the negative lead 53 and whose anode is connected to a lead 76, to which are connected resistor 49, the emitter of transistors 63 and 64 and the collector of transistor 66. In operation, a current constantly flows via diode 75 (which is a silicon diode) so that lead 76 has a potential which is about 0.8 V more positive than the potential of lead 53. This potential difference is utilized for reliably blocking transistors 63 and 64 in that resistors 56 and 57 are connected between the base of the associated transistor 63 or 64 and the negative lead 53. (Here again resistors 56 and 57 can be relatively high valued, e.g. in each case 12 kOhm.) As a result of this measure the transistors 63 and 64 are particularly voltage-proof which is desirable with motors.

For higher motor currents, e.g. larger loads, transistors 63 and 64 can be replaced by corresponding Darlington transistors 63' or 64'. Differential amplifier 60 then need not be designed for providing a very small current.

In the case of the arrangement of FIG. 8, the bases of transistors 54 and 55 are only coupled as regards a.c. voltage with the outputs 50 and 51 respectively of Hall generator 32, namely in each case via an electrolytic capacitor 77 or 78 which is made sufficiently large so that it does not differentiate the output voltage of the Hall generator 32. For example, these capacitors 77 and 78 can have values of in each case 10 microfarads.

As regards d.c. voltage, the bases of transistors 54 and 55 of differential amplifier 60 are connected substantially to the same potential in each case via a germanium diode 81 or 82 whose anodes are in each case connected to the base of the associated transistor and whose cathodes are connected to a common point 83, which in turn is connected via a low valued resistor 84, e.g. 7 Ohms, to the positive current input of Hall generator 32 and the base of transistor 66. Furthermore, point 83 is connected via resistor 52 to the positive lead 27. Here again transistor 66 is arranged as the third branch of differential amplifier 60.

Operation of the arrangement of FIG. 8:

On starting up of the motor 10, i.e. on switching on the d.c. voltage, rotor 11 (FIG. 1) is in its starting position wherein according to FIGS. 1, 2 or 4 a South pole (point 41 in FIG. 5) or a North pole (point 41' in FIG. 5) faces Hall generator 32. If it is assumed that in accordance with FIG. 1 a South pole is facing Hall generator 32, then output 51 is more negative than output 50 so that via resistor 59 and the emitter base path of transistor 55 a charging current flows into capacitor 78, making transistor 55 conducting. Consequently transistor 64 becomes conducting and motor winding 25 receives current so that the motor starts. If a North pole subsequently faces Hall generator 32, the output 51 thereof becomes more positive and output 50 more negative. When output 51 becomes more positive, capacitor 78 discharges via the previously blocked diode 82 which even with the relatively low output voltages of a Hall generator reliably conducts. (It would also be possible to use resistance networks of the like for discharging capacitors 77 and 78, but it has been found that the best results are obtained when using germanium diodes). When output 50 has become more negative because the motor has started, this relatively rapid potential change is transferred via capacitor 77 to the base of transistor 54 and makes the latter and consequently transistor 63 conducting, so that motor winding 26 receives current. Commutation then takes place continuously with the motor running, and in each case the capacitor is discharged on the non-conducting side of differential amplifier 60 via its germanium diode 81 or 82. (The discharge does not take place completely to zero and charges corresponding to the d.c. voltage portion of the signal, e.g. of about 0.7 V times 10 $\mu$F remain at the two electrolytic capacitors 77 and 78).

In the case of small flux densities $B_2$ in Hall generator 32, the outputs 50 and 51 of the Hall generator have approximately the same potential, so that the bases of transistors 54 and 55 also have a low potential difference. However, as a result of the voltage drop at resistor 84 which can be e.g. 0.15 V, the potential of the base of transistor 66 is about 0.15 V more negative than the bases of the two transistors 54 and 55, so that at low flux densities in Hall generator 32 transistor 66 takes over the full differential amplifier current and de-energizes both transistors 54 and 55 so that no current can flow in the motor.

If the running motor is stalled in operation so that it stops, then via the then conducting one of transistors 54 or 55 the corresponding capacitor 77 or 78 is charged to such an extent that said transistor is blocked. This charging process lasts, for example, for about one second, i.e., even in the stalled state the motor briefly still produces a torque. When the particular capacitor 77 or 78 is charged, the potential of the bases of both transistors 54 and 55 is determined by the potential of point 83 via diodes 81 and 82. As a result of the voltage drop at resistor 84, the potential at the base of transistor 66 is more negative, i.e., here again transistor 66 takes over the current of differential amplifier 60. As in this case current flows continuously in transistor 66, the latter heats up whereby its emitter-base threshold voltage $U_{th}$ decreases so that due to this heating after a brief heating period transistor 66 reliably takes over the full current of differential amplifier 60. As a result, transistors 54, 55, 63 and 64 are de-energized so that the motor is also de-energized. Thus, only a small percentage of the motor operating current flows, e.g. only 35 mA instead of 200 mA. On discontinuing the stalling, the motor can be re-started by hand whereby blocking is automatically eliminated, or it can be switched off for a few seconds and then switched on again, whereby it again starts because capacitors 77 and 78 have discharged. The motor can also be re-started by applying a short voltage pulse between leads 27 and 53.

The circuit according to FIG. 8 has the disadvantage that it does not adequately compensate for the large temperature dependency of commercial Hall generators, and therefore does not permit advantageous operation at high operating temperatures with the presently available Hall generators.

FIG. 9 shows a preferred circuit which is optimum according to present state of development and which is also stall-proof, produces the desired current gap and - due to its high sensitivity - also permits a high motor operating temperature even when installed within the motor. In addition, this circuit is very simple because no differential amplifier is used so that the third transistor 66 is eliminated, and very few electronic components are necessary. Parts which are the same or function in the same way as in the previous drawings are given the same reference numerals and are not explained again.

In the arrangement according to FIG. 9 electrolytic capacitors 77 and 78 of, for example, about 10 μF in each case, are used for the a.c. voltage coupling of transistors 54 and 55 to Hall generator 32. The transistors 54 and 55 are in a parallel branch to Hall generator 32 so that the current through Hall generator 32 is reduced if one of the transistors 54 or 55 is conducting. This serves as a current limitation for these transistors via negative feedback, because on reducing the current flowing in the Hall generator its output signal correspondingly decreases.

The emitters of the top transistors 54 and 55 are connected to a junction 90 which is connected via resistor 52 to positive lead 27 and also directly to the anode of a relatively well-conducting silicon diode 91 whose cathode is connected via a junction 92 with one input of the Hall generator 32. Diode 91 can be of ITT type 601, for example, which in the conducting state has a voltage drop of about 0.75 V.

The cathodes of two relatively poorly conducting silicon diodes 93 and 94 are connected together at nodal point 96. Nodal point 96 is connected to nodal point 92 via a resistor 97 of e.g. 3 KOhm. The anode of diode 93 is connected to the base of transistor 54 and the anode of diode 94 to the base of transistor 55. Diodes 93 and 94 can be of type BA 170. A silicon diode 98 may be provided parallel to Hall generator 32, but can in most cases be omitted with advantage.

Operation, with reference to FIGS. 10 to 14: In accordance with the definition of FIG. 11, the base-emitter diode of a transistor (54 or 55) is represented by a shaded triangle, while other diodes are represented by unshaded triangles.

FIG. 10 shows, while initially ignoring resistor 97, the serial connection of two electrically approximately equivalent diodes 55 and 94 that are, for example both made of silicon material, and have the same current flow direction. The serial connection of diodes 55 and 94 is in parallel with diode 91. In the quiescent state the voltage drop of about 0.7 V at diode 91 is divided over the two diodes 55 and 94 so that there is about 0.35 V across each of them. Hence, only a very small current of e.g. 0.001 mA flows through these diodes. If a negative pulse 101 of e.g. −0.2 V is now supplied via capacitor 78 to the connecting point 100 between diodes 55 and 94, diode 55 becomes conducting, i.e. with this circuit only a very small potential change at point 100 is necessary to make diode 55 conducting or - when applied to the circuit of FIG. 9 - to make transistor 54 or 55 conducting. Thus the voltage divider comprising members 55 and 94 reduces the threshold voltage of transistor 55, thereby making the circuit very sensitive.

FIG. 12 shows a variant of FIG. 10 wherein a diode 91 with a higher threshold voltage of, for example, is used. This voltage is reduced by voltage divider 102-97 to a voltage of about 0.7 V (resistor 102 is shown by dotted lines in FIG. 9).

FIG. 13 shows the arrangement together with the equivalent circuit diagram of the Hall generator 32. As diode 98 is located parallel to Hall generator 32, in operation a voltage of about 0.7 V is obtained at the latter and at $B_2$ = zero this voltage is sub-divided into the two represented partial voltages of each case 0.35 V so that with the motor running a d.c. voltage of about 0.7 V is obtained at capacitor 78, which voltage is substantially constant during motor operation. If the output 51 of Hall generator 32 becomes more negative, a charging current flows via transistor 55 into capacitor 78, i.e. transistor 55 becomes conducting. If the output 51 becomes more positive, the diode 55 is blocked and via diode 94, resistor 97 and Hall generator 32 a discharge current flows from capacitor 78 which in operation is thus discharged by the same amount that it was previously charged.

As resistor 97 (e.g. 3,000 Ohms) is much higher valued than the internal resistance of the Hall generator 32 (e.g. 30 Ohms, and moreover highly temperature-dependent the discharging time constant is substantially constant and larger than the charging time constant, so that a correspondingly higher voltage is obtained for the discharge.

Figure 14:
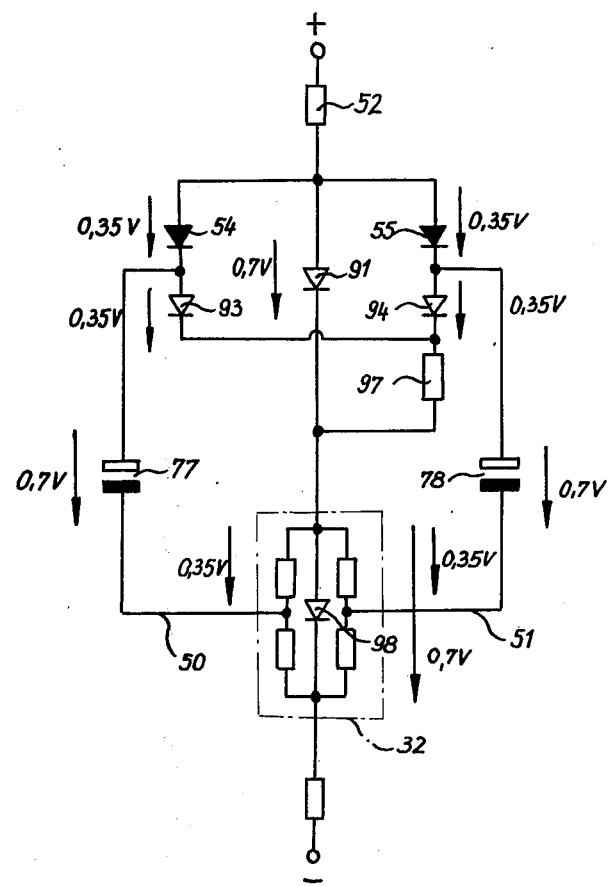

FIG. 14 shows the arrangement according to FIG. 13 complete for both outputs of the Hall generator 32 and with the voltages which typically occur in operation, and with identical potentials at the outputs 50 and 51 of the Hall generator, i.e. with a flux density $B_2$ acting on the Hall generator which is approximately equal to zero. Capacitors 77 and 78 have been charged to approximately the same voltage and both diodes 54 and 55 are not conducting, i.e., at $B_2$ = zero no current flows into motor windings 25 or 26. If then e.g. output 51 becomes more positive and output 50 more negative, there is a more pronounced blocking of diode 55 whereas diode 54 becomes conducting, which when applied to FIG. 9 means that transistors 54 and 63 become conducting and winding 26 receives current. Due to the symmetry of the circuit the same applied in an analogous way for the converse case where output 51 is more negative and output 50 more positive.

The current conducted by transistor 54 to transistor 63 or by transistor 55 to transistor 64 flows via resistor 52 and produces feedback action because it reduces the control current of Hall generator 32. However, due to diode 98, this reduction only takes place when no more current flows through the diode 98. (As long as a current flows through diode 98, a substantially constant voltage of about 0.7 V is applied to Hall generator 32, as indicated in FIGS. 13 and 14). Hall generator 32 has a higher resistance at lower temperature so that a relatively large amount of current flows through diode 98; output transistors 63 and 64 then have a reduced amplification so that they require a larger base current which is then supplied to them. At higher temperatures less current flows through diode 98 and the feedback action becomes greater.

If the motor is stalled that particular capacitor 77 or 78 charges whose associated Hall generator output happens to be negative, and since the bases of both transistors 54 and 55 will then receive the same potential as when the magnetic flux $B_2$ in Hall generator 32 equals zero or approximately zero, after a time lag of about one second neither of the two transistors 54 or 55 is conducting, and the current in both motor windings 25 and 26 is completely interrupted so that overheating of the motor is reliably avoided even in the case of stalling. Re-starting can take place in the same way as described relative to FIG. 8, i.e., by a voltage pulse to leads 27, 53, brief switching off, or manual starting of the motor.

The retardation of the discharging process by resistor 97 is advantageous because it delays the switching on of the particular transistor 54 or 55 whose capacitor is just being discharged, because the discharging process must have reached a predetermined stage before the respective transistor can be switched on. In this way the size of the current gap can be optimized.

The circuit of FIGS. 8 or 9 can naturally also be used with motors having more than two windings, e.g. in the known motor construction with four star-connected windings and controlled by two Hall generators, as shown e.g. in West German Disclosure Document No. 1,954,409.

The invention is not limited to motors whose commutation is controlled by Hall generators, but can equally well be used when commutating by other semiconductor control means which may be termed, in short, galvanomagnetic means, e.g. magnetic diodes or the like, because with such semiconductor control means once again a specific signal combination occurs when the current pause is to be produced. Naturally this signal combination will have a different form with other semiconductor control means, but its analogous evaluation in accordance with the principles of the present invention is easily possible in order to achieve the described effect.

Due to the very large number of possible combinations, a detailed description of all possible variants is not possible. In view of the numerous preferred embodiments described hereinabove, a person skilled in the art may readily design such motors with other semiconductor control means according to the principles of the present invention, whereby in an analogous manner stall-proof constructions are provided.

The circuits according to the invention are also suitable for other motor designs, e.g. internal rotor type motors such as, for example, described in U.S. Pat. No. 3,873,897, Muller, assigned to the assignee of this application, where the stator and rotor in development may have approximately the same air gap configuration as shown in FIG. 2 of the present application. The present circuits are also suitable for flat motors as shown, in e.g. in U.S. Pat. No. 3,840,761; Muller, assigned to the assignee of this application, because the same problems occur in such motors having a reluctance torque which is approximately oppositely phased to the a.c. portion of the electro-magnetic driving torque as in the motor according to FIG. 1 of the present application. In order to avoid making the present text unduly long, the contents of U.S. Pat. No. 3,873,879 and U.S. Pat. No. 3,840,761 are incorporated herein by reference.

I claim:

1. Brushless d.c. motor comprising:
a stator (18) having motor winding means (25, 26);
a permanent magnet rotor (11) rotatable relative to said stator;
a source of direct current (27, 53);
a rotor position-dependent semiconductor control means (32) having two pairs of terminals;
amplifying means responsive to said rotor position-dependent control means (32) and coupled to said direct current source and to said motor winding means for commutating the current in the motor winding means such that said motor winding means produces, in operation, an alternating magnetic field;
and a voltage divider (71, 72) having its end terminals coupled to one pair of the output terminals of the rotor position-dependent control means (32);
wherein said amplifying means includes a differential amplifier means (60) coupled to the other pair of output terminals of said semiconductor control means (32), the amplifying means having three output branches (54, 55, 66), two of said branches (54, 55) being coupled to control the currents in said motor winding means (25, 26);
and the voltage division ratio of the voltage divider (71, 72) being set such that the voltage of the tap point (70) of the voltage divider, when the rotor position-dependent control means (32) is subjected to a small or non-existent signal, will control said amplifying means so that current in said two branches tends to zero and current flow to said motor windings is blocked, said third branch substantially taking over and drawing the current of the differential amplifier means (60).

2. Motor according to claim 1 wherein said differential amplifier branches comprise respective transistors (54, 55, 66);
two of said transistors (54, 55) controlling current flow through the motor winding means;
said control means comprises a Hall generator (32) having two current inputs forming one terminal pair and two current outputs forming another terminal pair;
said current outputs (50, 51) being connected to the amplifying means;
said voltage divider (71, 72) being connected to the two current inputs of the Hall generator (32);
and the input of the transistor (66) of the third branch being connected to the tap point (70) of said voltage divider (71, 72);

and wherein said small or non-existing signal is a small or non-existing magnetic field due to the rotor, occurring in a range around the theoretical commutating point (FIG. 5: 180°-el 360°-el....etc.) as sensed by said Hall generator (32), (FIG. 6).

3. Motor according to claim 2, wherein said voltage divider comprises a resistor in series connection with one of the current inputs of said Hall generator (32) (FIG. 8).

4. Motor according to claim 1, wherein said rotor position-dependent control means comprises a galvanomagnetic control means (32) responsive to a magnetic field and providing a signal when subjected to a magnetic field;

and wherein said small or non-existing signal comprises the magnetic field acting on said galvanomagnetic control means when said rotor is positioned in a range around the theoretical commutating instant (FIG. 5: 180°-el, 360°-el...etc.) as sensed by said galvanomagnetic control means (32).

5. Motor according to claim 1 wherein said control means comprises a galvanomagnetic control means (32) having two current inputs and two outputs; said differential amplifier branches comprise respective transistors (54, 55, 66), the inputs of the transistors (54, 55) of the first two branches being d.c. coupled via a common resistor (84) to one of the two current inputs of the galvanomagnetic control means (32), the base of the transistor (66) of the third branch being connected to said one current input, and the inputs of the two transistors (54, 55) of the first two branches being a.c. coupled to the outputs (50, 51) of the galvanomagnetic control means (32) (FIG. 8).

6. Motor according to claim 5 including at least two capacitors (77, 78), coupling the inputs of the two transistors (54, 55) of the first two branches to respective outputs of said galvanomagnetic control means (32).

7. Motor according to claim 6 further including a discharge circuit (81, 82) associated with each of said capacitors (77, 78), the discharging time constant of the capacitors preferably being different from the charging time constant thereof.

8. Motor according to claim 6, wherein said control means comprises a Hall generator (32) having a current input; one terminal of each of said capacitors (77, 78) being connected to respective inputs of said transistors (54, 55) and being further connected via respective diodes (81, 82; 93, 94) to a current input of the Hall generator (32).

9. Motor according to claim 8 wherein said diodes (81, 82) have electrodes coupled to a common node; between the interconnected electrodes of said diodes (81, 82) and the associated current input of the Hall generator (32) there is provided a low-valued resistance means (84); the two transistors controlled by said control means are adapted as a differential amplifier; and said current input of said Hall generator is connected to the input of a transistor (66) arranged in a third branch of said differential amplifier.

10. Motor according to claim 8 wherein said diodes (81, 82) are arranged to be reversed biased by an output potential of said Hall generator, said Hall generator being adapted to selectively render at least one of said transistors (54, 55) conductive.

11. Motor according to claim 6 wherein said diodes are germanium diodes (81, 82).

12. Motor according to claim 1 comprising a protection diode (75) coupled in the direct current circuit for protecting the electrical components of the motor (10) against wrong-polarity-connection, said amplifying means includes switching transistor means (63, 64; 63', 64') coupled to said stator winding means for switching the winding currents, said protection diode (75) being arranged in the emitter-collector path of said switching transistor means in order to utilize the voltage drop at the diode (75) occurring thereat in operation as a blocking voltage for said switching transistor means.

13. Motor according to claim 1, wherein said rotor position-dependent semiconductor control means comprises a galvanomagnetic control means (32) located in and controlled by the magnetic field of the permanent magnetic rotor (11), said rotor (11) having pole portions with first (14, 15) and second (14', 15') clearances therebetween, said first pole clearances (14, 15) of the rotor interacting with the stator and being narrower than said second pole clearances (14', 15'), said second pole clearances (14', 15') interacting with the galvanomagnetic control means.

14. Motor according to claim 13 wherein said second pole clearances (14', 15') of said rotor (11) interacting with said galvanomagnetic control means (32 are displaced relative to the remaining portions of said pole clearances.

15. Motor according to claim 13, wherein said permanent magnet rotor comprises a rotor magnet (13) having trapezoidal form of magnetization.

16. Brushless d.c. motor comprising a stator with a winding means, a permanent magnet rotor rotatable relative thereto, a source of direct current, rotor position-dependent semiconductor commutating means and amplifying means capacitively coupled thereto and further coupled to said direct current source, and discharge means associated with and connected to said capacitive coupling means.

17. Apparatus according to claim 16 wherein said discharge means comprises diodes poled to carry the discharge current of said capacitive coupling means.

18. Apparatus according to claim 17, wherein the semiconductor commutating mans is a Hall generator (32);

and including at least two transistors the inputs of which are coupled via respective capacitors (77, 78) to the outputs of a Hall generator one terminal of each of said capacitors being connected to respective inputs of said transistors and being further connected by a respective one of said discharge diodes to a current input of the Hall generator.

19. Apparatus according to claim 18 wherein said discharge diodes (81, 82) are arranged to be reverse biased by an output potential of said Hall generator, said Hall generator being adapted to selectively render at least one of said transistors (54, 55) conductive.

20. Apparatus according to claim 18, wherein said diodes have electrodes coupled to a common junction; between the interconnected electrodes of said diodes and the associated current input of the Hall generator (32) there is provided a low-valued resistance means (84); the two transistors controlled by said control means are connected as a differential amplifier; and said current input of said Hall generator is connected to the input of a transistor (66) arranged in a third branch of said differential amplifier.

21. Apparatus according to claim 20 wherein said diodes are germanium diodes (81, 82).

22. Apparatus according to claim 16 wherein said stator winding means includes two motor windings (25, 26); said amplifying means includes an amplifier having at least two transistors (54, 55); said semiconductor commutating means comprises a Hall generator (32) having two outputs controlling said amplifier; voltage divider means (54 - 93, 55 - 94 coupled to said amplifier for reducing the base emitter threshold voltages of said amplifier for reducing the base emitter threshold voltages of said amplifier transistors (54, 55) controlled by said Hall generator, the inputs of said amplifier transistors (54, 55) being respectively capacitively (77, 78) coupled to said outputs (50, 51) of said Hall generator (32).

23. Apparatus according to claim 16 comprising a protection diode (75) coupled in the direct current circuit for protecting the electrical components of the apparatus (10) against wrong-polarity-connection, said amplifying means includes switching transistor means (63, 64; 63', 64') capacitively coupled to said stator winding means for switching the winding currents, said protection diode (75) being arranged in the emitter-collector path of said switching transistor means in order to utilize the voltage drop at the diode (75) occurring thereat in operation as a blocking voltage for said switching transistor means.

24. Apparatus according to claim 16, wherein said commutating means is located in and adapted to be controlled by the magnetic field of the permanent magnetic rotor (11), said rotor (11) having pole portions with first (14, 15) and second (14', 15') clearances therebetween, said first pole clearances (14, 15) of the rotor interacting with the stator and being narrower than said second pole clearances (14',15'), said second pole clearances (14', 15') interacting with said commutating means.

25. Apparatus according to claim 24, wherein said second pole clearances (14', 15') of said rotor (11) interacting with said commutating means (32) are displaced relative to the remaining portions of said pole clearances.

26. Motor according to claim 24, wherein said permanent magnet rotor comprises a rotor magnet (13) having trapezoidal form of magnetization.

27. Brushless d.c. motor comprising:
a stator with stator winding means;
a permanent magnet rotor rotatable relative to said stator;
a source of direct current (27, 53):
a rotor position-dependent semiconductor control means; and
amplifying means responsive thereto coupled to said direct current source and to said stator winding means for commutating the current in the stator winding means such that said stator winding means produces in operation an alternating magnetic field;
wherein said control means comprises
a Hall generator (32) having a pair of outputs (50, 51); said amplifying means including a pair of operational amplifiers (73, 74) respective one inputs of which are connected to responsive outputs of said Hall generator, the other inputs of said operational amplifiers (73, 75) being connected to a potential (70) which differs from the potential of the Hall generator outputs (50, 51) when a small or non-existing magnetic field is acting on the Hall generator (32).

28. Motor according to claim 27, wherein said Hall generator (32) is located in and controlled by the magnetic field of the permanent magnetic rotor (11), said rotor (11) having pole portions with first (14, 15) and second (14', 15') clearances therebetween, said first pole clearances (14, 15) of the rotor interacting with the stator and being narrower than said second pole clearances (14', 15'), said second pole clearances (14', 15') interacting with the Hall generator.

29. Motor according to claim 28 wherein said second pole clearances (14', 15') of said rotor (11) interacting with said Hall generator (32) are displaced relative to the remaining portions of said pole clearances.

30. Brushless d.c. motor comprising:
a stator (18) with stator winding means:
a permanent magnet rotor (11) rotatable relative to said stator;
a source of direct current (27, 53);
a rotor position-dependent semiconductor control means (32); and
amplifying means responsive thereto coupled to said direct current source and to said stator winding means for commutating the current in the stator winding means such that said stator winding means produces in operation an alternating magnetic field;
wherein said amplifying means includes an amplifier having at least two transistors (54, 55); said rotor position-dependent semiconductor control means (32) having two outputs controlling said amplifier; and means (54, 93, 55-94) coupled to said amplifier for reducing the base emitter threshold voltages of said amplifier transistors (54, 55) controlled by said semiconductor control means the inputs of said amplifier transistors (54, 55) being respectively capacitively (77, 78) coupled to said outputs (50, 51) of said semiconductor control means (32).

31. Motor according to claim 30 wherein the semiconductor control means comprises a Hall generator (32); and
the emiter-collector paths of said amplifier transistors (54, 55) controlled by said Hall generator (32) are connected in parallel to the current path of said Hall generator (32).

32. Motor according to claim 31 comprising a constant voltage element (91) arranged in the current path of said Hall generator (32), the operating voltage during operation of said constant voltage element being coupled at least partly to two parallel series circuits each of which comprises the control path of one of said amplifier transistors (54, 55) and a respective additional diode (93, 94) connected in series with a respective control path and approximately electrically equivalent thereto.

33. Motor according to claim 32 wherein said constant voltage element comprises a silicon diode.

34. Motor according to claim 32 wherein said additional diodes (93, 94) in series with said respective control paths are connected to a common point (96) which is connected to a current input of said Hall generator (32) via a discharge resistor (97).

35. Motor according to claim 34 wherein said discharge resistor (97) is high valued compared with the internal resistance of the Hall generator (32).

36. Motor according to claim 30 comprising a diode (98) operated in the flow direction and coupled in parallel with the current path of said Hall generator (32).

37. Motor according to claim 30 comprising a protection diode (75) coupled in the direct current circuit for protecting the electrical components of the motor (10) against wrong-polarity-connection, said protection diode (75) being arranged in the emitter-collector path of said amplifier transistor means (54, 55) in order to utilize the voltage drop at the diode (75) occurring thereat in operation as a blocking voltage for said amplifier transistor means.

38. Motor according to claim 30, wherein said semiconductor means located in and adapted to be controlled by the magnetic field of the permanent magnetic rotor (11), said rotor (11) having pole portions with first (14, 15) and second (14', 15') clearances therebetween, said first pole clearances (14, 15) of the rotor interacting with the stator and being narrower than said second pole clearances (14', 15'), said second pole clearances (14', 15') interacting with the control means (32).

39. Motor according to claim 38, wherein said second pole clearances (14', 15') of said rotor (11) interacting with said control means (32) are displaced relative to the remaining portions of said pole clearances.

40. Motor according to claim 38, wherein said permanent magnet rotor comprises a rotor magnet (13) having trapezoidal form of magnetization.

41. Motor according to claim 30, wherein said motor has a neutral zone, extending between adjacent stator poles and wherein said semiconductor control means (32) is displaced from said neutral zone counter to the direction (16) of said rotor (11).

42. Motor according to claim 41, wherein said permanent magnet rotor comprises a rotor magnet (13) having trapezoidal form of magnetization.

43. Ventilating apparatus comprising the motor of claim 30,
wherein said ventilating means is an axial fan of short axial length including fan blades directly connected to said rotor and containing said control means, and all circuit elements associated with and forming part of said amplifying means within the motor housing.

44. Brushless d.c. motor comprising
a stator with stator winding means (25, 26);
a permanent magnet rotor (11) rotatable relative to said stator;
a source of direct current (27, 53);
a rotor position-dependent semiconductor control means (32);
amplifying means including two operational amplifiers (73, 74) responsive to said rotor position-dependent semiconductor control means (32) and coupled to said direct current source and to said stator winding means to control commutation of current in the stator winding means such that said stator winding means produces, in operation, an alternating magnetic field;
a voltage divider;
wherein said rotor position-dependent semiconductor control means (32) has terminals coupled to inputs of said amplifying means and additional terminals coupled to the end terminals of the voltage divider (71, 72),
the tap point (70) of said voltage divider being additionally connected to said amplifying means, the voltage division ratio of the voltage divider (71, 72) being set such that the voltage at said tap point of said voltage divider, when a small or non-existing signal is acting on said rotor position-dependent control means (32), provides an output voltage at said additional connection to the amplifying means to tend to control the output voltages of both said operational amplifiers (73, 74) to go to zero so that the current in said motor winding means is effectively blocked.

45. Motor according to claim 44, wherein said rotor position-dependent semiconductor control means comprises a Hall generator (32) having a first pair of terminals (50, 51) coupled to inverting inputs of said operational amplifiers (73, 74) and having a second pair of terminals forming control current inputs, said control current inputs being coupled to the end terminals of said voltage divider (71, 72), said tap point (70) being connected to respective direct inputs of said operational amplifier (FIG. 7).

46. Motor according to claim 45, wherein said Hall generator (32) is located in and controlled by the magnetic field of the permanent magnetic rotor (11), and rotor (11) having pole portions with first (14, 15) and second (14', 15') clearances therebetween, said first pole clearance (14, 15) of the rotor interacting with the stator and being narrower than said second pole clearance (14', 15'), said second pole clearance (14', 15'), said second pole clearance (14', 15') interacting with the Hall generator.

47. Brushless d.c. motor comprising a stator (18) having motor winding means (25, 26);
a permanent magnet rotor (11) rotatable relative to said stator;
a source of direct current (27, 53);
a rotor position-dependent semiconductor control means (32);
amplifying means including controlled switch means and coupled to said rotor position-dependent control means, the amplifying means and said switch means controlling and commutating current in the motor winding means such that said motor winding means produces, in operation, an alternating magnetic field;
wherein said amplifying means includes a differential amplifying means (60) coupled to said rotor position-dependent semiconductor control means (32), the amplifying means comprising three branches (54, 55, 66), two of said branches (54, 55) being coupled to control the controlled switch means and hence the currents in said motor winding means (25, 26), and circuit means coupled to said two branches for controlling said third branch and said amplifying means and hence said controlled switch means to block current flow to said motor winding means when a small or non-existing signal acts on said rotor position-dependent control means in a range around the theoretical commutating instant (FIG. 5: 180°-el, 360°-el....etc.) as sensed by said rotor position-dependent control means.

48. Motor according to claim 47, wherein said third branch substantially takes over and draws control current derived from said differential amplifier means (60) (FIGS. 1, 6).

49. Motor according to claim 47, wherein said network means comprises a reference means (71, 72) coupled to said rotor position-dependent semiconductor control means (32) and connected to control said differential amplifier means (60) to effectively block said control switch means when only a small or non-existing signal is sensed by said rotor position-dependent semiconductor control means (FIGS. 7, 9).

50. Motor according to claim 47, wherein said circuit means comprises a capacitative coupling between said rotor position-dependent control means (32) and said amplifier means (60) (FIG. 8, FIG. 9).

* * * * *

UNITED STATES PATENT AND TRADEMARK OFFICE
CERTIFICATE OF CORRECTION

PATENT NO. : 4,030,005
DATED : June 14, 1977
INVENTOR(S) : Benno Doemen

It is certified that error appears in the above-identified patent and that said Letters Patent are hereby corrected as shown below:

Patent claim 11 should be referred to claim 9;

Patent claim 38, second line after "means", insert -- is --

*Signed and Sealed this*

*Fifteenth* Day of *November 1977*

[SEAL]

Attest:

RUTH C. MASON
*Attesting Officer*

LUTRELLE F. PARKER
*Acting Commissioner of Patents and Trademarks*